United States Patent

[11] 3,576,049

[72] Inventor William J. Williams
320 E. 12th St., Owensboro, Ky. 42301
[21] Appl. No. 784,839
[22] Filed Dec. 18, 1968
[45] Patented Apr. 27, 1971

[54] APPARATUS FOR PLASTIC CAPPING A WOODEN BROOM BLOCK BY INJECTION MOLDING
2 Claims, 6 Drawing Figs.

[52] U.S. Cl. ............................................ 18/36, 249/91
[51] Int. Cl. .................................................... B29d 3/00
[50] Field of Search ............................................ 18/45 (M), 36, 420; 249/83, 91, 145, 102, 143, 155

[56] References Cited
UNITED STATES PATENTS

| | | | |
|---|---|---|---|
| 2,256,769 | 9/1941 | Ainrine | 18/36 |
| 2,357,950 | 9/1944 | Goessling | 18/36X |
| 2,704,875 | 3/1955 | Kingston | 249/145 |
| 3,060,509 | 10/1962 | Cubbins | 18/45X |
| 3,095,613 | 7/1963 | Christensen et al. | 249/145 |
| 3,138,827 | 6/1964 | Hamilton | 249/145 |
| 3,226,771 | 1/1966 | Squqda | 18/42D |
| 3,312,765 | 4/1967 | Scott | 18/45X |
| 3,433,292 | 3/1969 | McDonald | 18/42 |
| 3,363,040 | 1/1968 | Aoki | 18/36X |
| 3,373,479 | 3/1968 | Watt et al. | 18/36X |

FOREIGN PATENTS

| | | | |
|---|---|---|---|
| 20,234 | 1963 | Japan | 249/155 |

*Primary Examiner*—Howard J. Flint, Jr.
*Attorney*—Cushman, Darby and Cushman

ABSTRACT: The wooden block is placed in an injection mold cavity and the core side of the mold closed against the cavity. The block is somewhat thinner front-to-back than the cavity. Pins corresponding to the locations of handle sockets position the block in the cavity. Fluid plastic material is injected into the cavity from the two end extremes against the top of the block thus forcing its bristle receiving bottom face flat against the core side of the mold. Grooves in the top of the block at its ends ease flow of the plastic material as described. The mold includes removable and replaceable extension sections between the mid and two opposite end sections to accommodate capping of differing length blocks.

PATENTED APR 27 1971
3,576,049
SHEET 1 OF 2
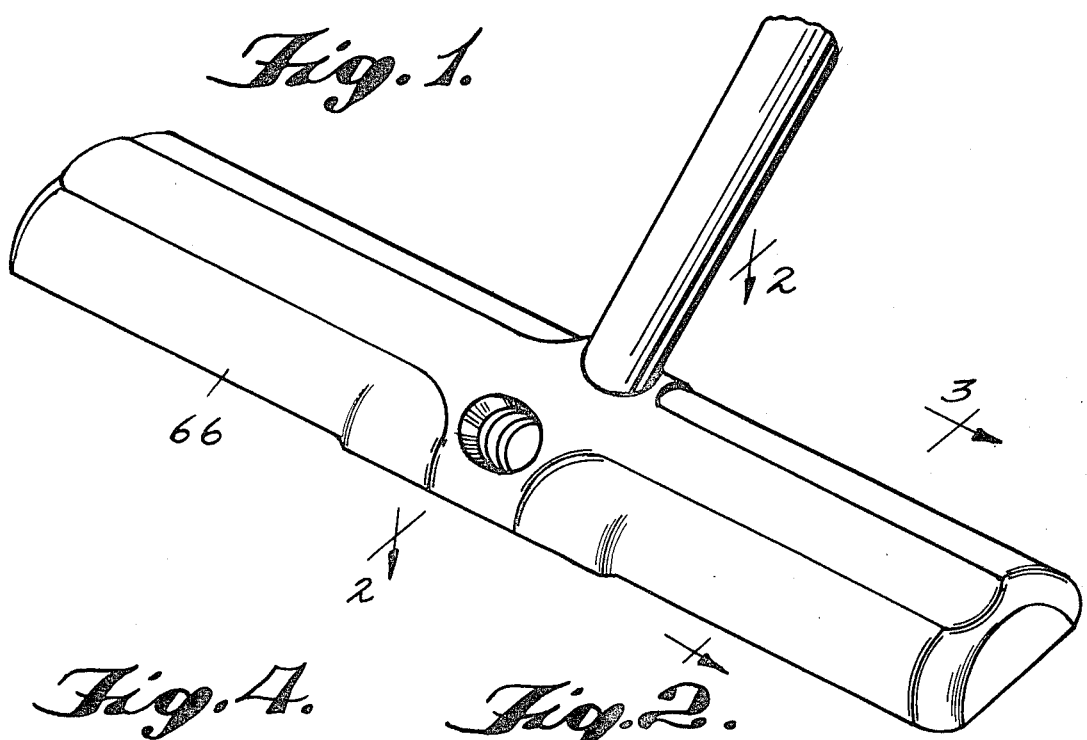
Fig. 1.
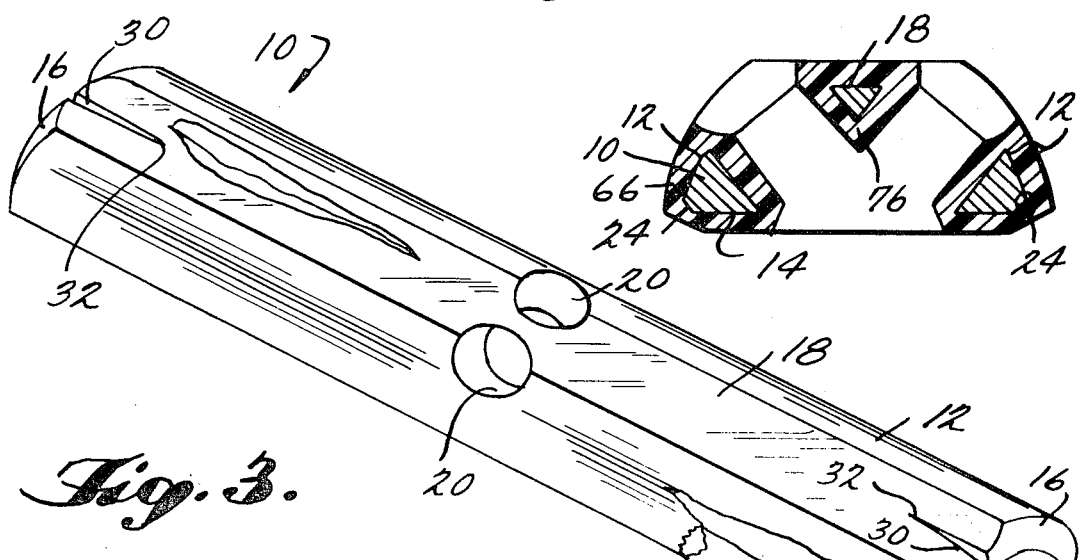
Fig. 4.   Fig. 2.
Fig. 3.
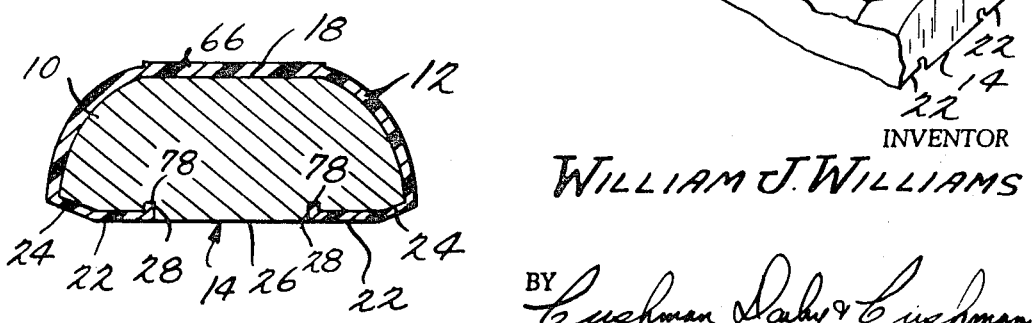
INVENTOR
WILLIAM J. WILLIAMS
BY Cushman, Darby & Cushman
ATTORNEYS

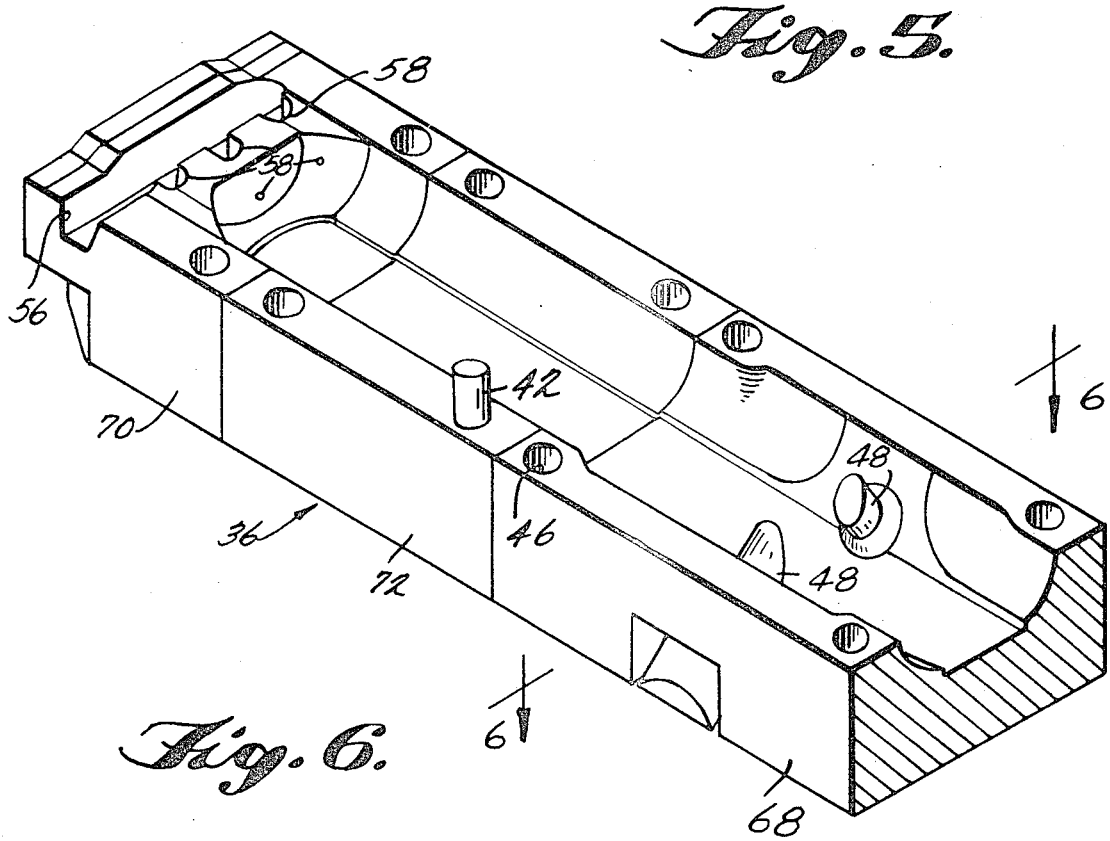
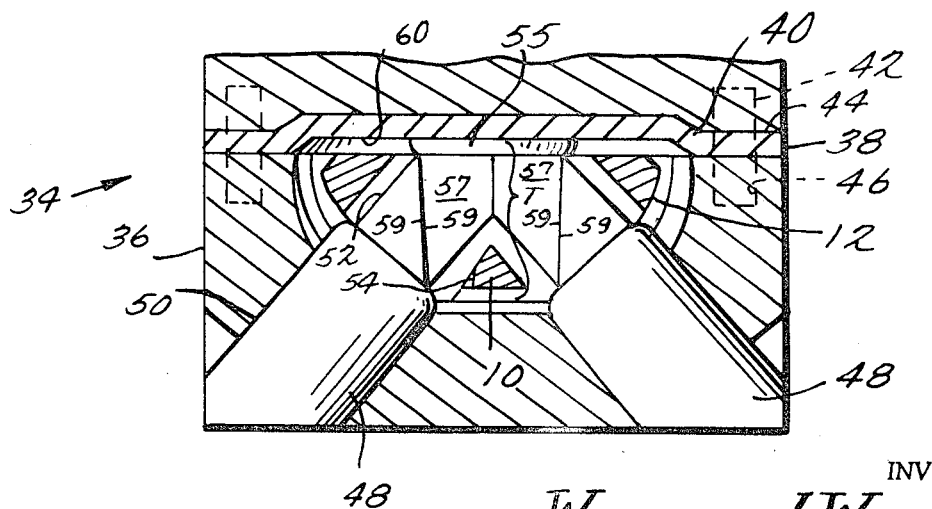

APPARATUS FOR PLASTIC CAPPING A WOODEN BROOM BLOCK BY INJECTION MOLDING

BACKGROUND OF THE INVENTION

Push brooms of the type having a block from the under side of which an array of bristles protrude downwardly and having two alternatively used broom handle receiving sockets opening generally upwardly and forwardly, and upwardly and rearwardly, respectively, are well known.

Traditionally, push-broom broom blocks have been made entirely of wood. With the advent of the plastics age some attempts have been made to make broom blocks entirely of molded plastic material. However, brooms of the latter type are too light in weight for the feel many people associated with proper push-broom sweeping, i.e., the light weight brooms may tend to ride over dirt rather than push it along unless the user bears down on the broom handle, more than he may wish to.

Wooden blocks retain a large segment of the market because the raw stock has historically been plentiful, is machineable by well-known methods, for instance, on a wood lathe, and has a comfortable weight for reasonably efficient sweeping.

As the price of raw wood stock has risen, broom manufacturers have become increasingly discomforted as they note the percentage of rough blocks which must be scrapped during the manufacturing process because of unsightly surface cracks, knots and exposed corky regions, since most of these scrapped blocks possess sufficient mechanical strength to make an acceptably sound push broom. However, their unsightly exterior would be enough to prevent customers from buying push brooms conventionally made from such blocks.

SUMMARY OF THE INVENTION

In its preferred embodiment, the invention provides a way of utilizing wooden broom blocks which would otherwise have to be discarded due to their poor exterior appearance. Such blocks may have cracks, splits, corky regions, knots and other similar defects. The blocks are each provided with an injection molded-inplace cap of plastic material which jackets all of the broom block except where the broom bristles protrude or will protrude from block.

The wooden block is placed in an injection mold cavity and the core side of the mold closed against the cavity. The block is somewhat thinner front-to-back than the cavity. Pins corresponding to the locations of handle sockets position the block in the cavity. Fluid plastic material is injected into the cavity from the two end extremes against the top of the block thus forcing its bristle receiving bottom face flat against the core side of the mold. Grooves in the top of the block at its ends ease flow of the plastic material as described. The mold includes removable and replaceable extension sections between the mid and two opposite end sections to accommodate capping of differing length blocks.

Of course, the process described may be utilized on undamaged wooden broom blocks as well.

BRIEF DESCRIPTION OF THE DRAWINGS

The principles of the invention will be further hereinafter discussed with reference to the drawings wherein a preferred embodiment is shown. The specifics illustrated in the drawings are intended to exemplify, rather than limit, aspects of the invention as defined in the claims.

FIG. 1 is a perspective view of the capped broom block from above and from nearer one end thereof;

FIG. 2 is a transverse vertical sectional view along line 2–2 of FIG. 1;

FIG. 3 is a transverse vertical sectional view along line 3–3 of FIG. 1;

FIG. 4 is a perspective view, similar to FIG. 1 of a surface-damaged wooden broom block which could be capped as illustrated in FIGS. 1—3;

FIG. 5 is a perspective view of the cavity section of a mold for capping the block of FIG. 4, the near end section, which is a mirror image replica of the far end section having been removed to expose interior detail; and FIG. 6 is a transverse vertical sectional view of the mold of FIG. 5 and taken substantially along line 6–6 thereof and also showing the movable core section, a broom block being capped in the preferred manner in the mold.

DESCRIPTION OF THE PREFERRED EMBODIMENT

The Wooden Block

The broom block 10 is made of wood of the type conventionally used to make wooden push broom blocks, for instance, oak or beech; softer woods, such as pine, because the capping protects the block against denting and cracking; and even composition materials such as wood chip or sawdust filled urea-formaldehyde resin. The block 10 is generally semicylindrical in end elevation view, thus having a generally curved top or back 12 and a generally flat bottom 14. The ends 16 are preferably rounded off and the block may be thinner than a full semicylinder by the thickness of a flat 18 of about 45° extent, generally parallel to and opposite the bottom 14.

Centrally of the block, two openings 20 are formed therethrough from the top, and spaced about 50° apart about the longitudinal axis of the imaginary cylinder of which the block 10 generally forms a longitudinal half. The diameter of each opening 20 is, in the example shown, about fifteen-sixteenths inch and the thickness of the block from flat 18 to bottom 14 is about fifteen-sixteenths inch.

The strips 22 of the block bottom bordering the front/rear edges 24 of the block are relieved thickness-wise about one thirty-second inch by about ⅝-inch wide. Immediately adjacent the unrelieved portion 26 of the bottom, the strips 22 are more deeply relieved to form two downwardly opening, longitudinally extending grooves 28 each about one-sixteenth inch deep and one-sixteenth inch wide, measured from the unrelieved portion 26. This latter portion is the one which will receive the bases of tufts of bristles in a conventional manner, preferably subsequent to the capping process. The edges 24 are preferably rounded off, as shown.

The top of the block 10, adjacent and deepening toward the ends 16 is grooved at 30, shown in the flat region 18. The grooves 30 are longitudinally extending and in the example, feather from starting points 32 to depths of about one-half inch at the ends 16 and each traversing about five-eighths inch along the block. At their widest, the grooves 30, shown as vee-shaped notches, are about ⅛-inch wide.

The Mold

In molding a cap about the block, many different commercially available injection molding machines could be used. In this example, a 16 ounce HPM ram-type injection molding machine was used to mold two blocks per shot. Each mold 34 comprises a cavity section 36 (mounted on the stationary platen of the injection molding machine). Closure section 38, actually a generally flat steel plate turned up at the side edges 40, is mounted on the movable platen of the molding machine. Staff pins 42 projecting from the borders 44 of the closure section 38 enter corresponding sockets 46 bordering the cavity section of the mold as the mold is closed.

In the example, (with reference to FIG. 6), the thickness of the mold cavity at T is about one-sixteenth inch greater than the thickness of the block 10.

The cavity section of the mold includes two pins 48 corresponding in relative location to the openings 18 through the block 10. The diameter of each pin 48 is about fifteen-sixteenths inch at 50 and about five-eighths inch at 52. From 52 the pins are truncated sufficiently so the block 10 will fit down over them until its back rests upon the surface 54 of the mold cavity. From a central boss 55, two complementarily truncated pins 57 protrude from the mold closure section 38 to complete coring of the openings 18. When the mold is closed, the parallel surfaces 59 are facing one another with as little spacing as possible. Each of the two sets of pins consisting of one pin 48 and one pin 57 constitute an oblique, cylindrical core for forming the lining 76 of an oblique opening through the broom block where the broom handle will eventually be connected.

The mold cavity is supplied with fluid plastic material through a gate 56 at each end, which branches into several subgates 58 which enter the cavity in such sense as to direct fluid plastic material toward the mold section 38.

Accordingly, in capping a block in accordance with the preferred embodiment of the invention, a block 10 is inserted in the mold with the two pins 48 entering the corresponding openings 18 to position the block in the mold. The mold is then closed and a shot of fluid plastic material forced through the gate 56 and subgates 58. This pushes the block against the mold closure section 38, specifically pushing the flat surface 26 against the flat surface 60 and thus capping or encapsulating all of the block, but for the surface 26. The grooves 30 and subgates 58 are so relatively located that some of plastic material 64 entering the mold cavity slips through the grooves 30. That which does plays an important role in forcing the block tightly against the surface 60 and in distributing plastic material over the back of the block to provide the block with a cap 66.

It should now be noticed that the mold sections are segmental, each including a central part 68, two mirror-image end parts 70 and two intermediate parts 72 of constant, uniform cross-sectional size and shape. It is within the purview of the invention to separate the mold section parts from one another and to replace the intermediate parts 72 with other parts 72 of identical shape, but different length or to insert and remove additional parts 72 (including removing parts 72 in their entirety and placing the end parts immediately adjacent the central part) both to accommodate the capping of broom blocks of differing length. For instance, after capping a run of 10 inch long broom blocks, it may be desired to cap a run of 24 inch long broom blocks whereupon the mold section parts would be separated and intermediate parts 72 of the corresponding length installed.

After capping, the mold is opened and the capped block removed, for instance by being pushed out with conventional removal pins (not shown).

It should be noticed that the cap 66 extends around all sides of the block including peripherally lining the holes 18 so that the diameter of each is reduced from about fifteen-sixteenths inch to about five-eighths inch. As these holes merge into one another part way through the block, the lining at 76 is an important factor in holding the cap 66 securely against the block. The lining 76 may later be conventionally tapped to produce helical threads for removably attaching a handle to the broom via either of the holes 18.

Another factor in holding the cap on the block is the lining portions 78 which fill the recesses of the strips 22 to a level even with that of the surface 26, including filling the grooves 28.

Preferred Molding Values

Among somewhat resilient molding materials conventionally used in injection molding, low density polyethylene, specifically 22 melt, low density polyethylene is the material presently preferred for the cap 66, but other injection molding plastic raw materials with good flow characteristics could be used.

When the hot material flows over the block 10, there is a surface friction generated which tends to cause folding or rolling type flow of the material unless certain techniques with respect to temperature and injection pressure are used. The hot material and pressure also cause the blocks to generate moisture and gases which could cause problems near the center of the block, including sinking and swelling near the thickest cap section, which is the top center. This can be controlled by temperature selection that gives minimum viscosity to the material without crystallization or burning or discoloration of the material used.

The various plastic materials used will react differently to specific temperatures as is generally known in this injection molding art. The preferred temperature range for the 22 melt low density polyethylene is 470° F. on the back heaters of the injection molding machines, 480 on the front with a slow ram injection of 500 to 1,000 p.s.i. As an example, the high density polyethylene with a low melt such as 14 to 16, the preferred temperature range is between 550 and 600 on the front heaters with 500 on the rear heater with 15,000 p.s.i. injection pressure over a period of 6 to 8 seconds whereas the ram input time for the low density polyethylene material would be between 15 and 20 seconds. This is dependent on the length of the block being encapsulated because of the shot size variation. The overall cycle time will vary between 30 and 60 seconds, again depending on the length of the block being shot which is, of course, relative to the shot size and the amount of sinking and swelling that must be controlled on the surface of the block.

It should now be apparent that the Plastic Capped Wooden Broom Block as described herein above possesses each of the attributes set forth in the specification under the heading "Summary of the Invention" hereinbefore. Because the Plastic Capped Wooden Broom Block of the invention can be modified to some extent without departing from the principles of the invention as they have been outlined and explained in this specification, the present invention should be understood as encompassing all such modifications as are within the spirit and scope of the following claims.

I claim:

1. Apparatus for injection molding a cap of plastic material in situ about a wooden broom block, comprising:

means defining a mold cavity member having a cavity shape similar to the exterior shape of the back of the broom block and dimensions slightly larger than those of the broom block back exterior;

means defining a mold closure member adapted to move along a path to removably close said mold cavity and configured such that when closed, the mold cavity is at least about one-sixteenth inch greater than the thickness of the broom block; and gate means defined in said mold cavity member, aimed toward said mold core member, thereby tending to force the broom block when being capped in the cavity toward and against the mold core member; said apparatus being adapted for casing two oppositely oblique openings through the broom block which extend toward one another as they proceed downwardly in the broom block from the back of the broom block by additionally including two first generally cylindrical core halves on said mold closure member projecting oppositely obliquely toward said mold cavity member; two second generally cylindrical core halves on said mold cavity member projecting obliquely toward said mold closure member; each cylindrical first core half being longitudinally aligned with a respective one of the two cylindrical second core halves and having ends lying adjacent one another; to constitute a first core and a second core, said ends generally lying in planes parallel to said path of the mold closure member, said first and second cores being of lesser diameters than the oblique opening through said broom block which are to be cased.

2. The apparatus of claim 1, adapted for casing broom blocks of differing lengths by having: said mold cavity member and said mold closure member being transversely divided into a plurality of longitudinally adjacent segments removably selectively assembleable to constitute said mold cavity member and said mold closure member.